US009779579B2

(12) United States Patent
Matthiesen

(10) Patent No.: US 9,779,579 B2
(45) Date of Patent: Oct. 3, 2017

(54) SINGLE REEL GAME SYSTEM AND METHOD

(71) Applicant: Neil Matthiesen, Sioux Falls, SD (US)

(72) Inventor: Neil Matthiesen, Sioux Falls, SD (US)

( * ) Notice: Subject to any disclaimer, the term of this patent is extended or adjusted under 35 U.S.C. 154(b) by 168 days.

(21) Appl. No.: 14/550,300

(22) Filed: Nov. 21, 2014

(65) Prior Publication Data

US 2015/0141116 A1 May 21, 2015

Related U.S. Application Data

(60) Provisional application No. 61/907,141, filed on Nov. 21, 2013.

(51) Int. Cl.
*G06F 17/00* (2006.01)
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
USPC ...................................................... 463/16–25
See application file for complete search history.

(56) References Cited

U.S. PATENT DOCUMENTS 9,396,616 B2 * 7/2016 Baerlocher ......... G07F 17/3244
2014/0243069 A1 * 8/2014 Hoffman ............. G07F 17/3265 463/20
2015/0287268 A1 * 10/2015 Kim ...................... G07F 17/322 463/20

* cited by examiner

*Primary Examiner* — Ronald Laneau
(74) *Attorney, Agent, or Firm* — Newman Law, LLC

(57) ABSTRACT

Systems and methods configured to display a single reel game including a plurality of cells and one or more scenarios, symbols or game event descriptions positioned within the cells that impact game credit, in which the selection of a cell is based on the prior cell selected and the random selection of a number from a group of a numbers.

20 Claims, 5 Drawing Sheets

SINGLE REEL GAME SYSTEM AND METHOD

CROSS-REFERENCE TO RELATED APPLICATIONS

This application claims the benefit of U.S. Provisional Patent Application No. 61/907,141 which was filed Nov. 21, 2013, the disclosure of which is hereby incorporated by reference in its entirety.

BACKGROUND OF THE INVENTION

The invention relates generally to electronic gaming equipment, and more particularly, to an electronic gaming machines, games and special or bonus game features that may be offered to facilitate and encourage game play thereon.

Gaming machines, have become a major source of entertainment in many parts of the world. Traditionally such machines were mechanical devices where a number of reels could be made to spin randomly. Each reel includes cells marked with a plurality of numbers or symbols. If, upon coming to a rest, the subsequent array of numbers or symbols displayed in the cells along a "payline" corresponded to predetermined patterns, then the machine would provide a prize or payout.

Bonus games that may be played in conjunction with the underlying slot game are often used to enhance the entertainment value of the game. The bonus game may comprise any type of game, either similar to or completely different from the underlying game, but is typically initiated upon the occurrence of a selected event or outcome in the underling game.

Some gaming players do not play slot type gaming machines because they find them unappealing. Even slot game players often seek out new games to play because while the symbols and themes may change, the overall design and game play of slot games often remains the same. Accordingly, new games and features are necessary to appeal to player interest and enhance excitement in order to attract new players, entice longer play and increased profitability.

SUMMARY OF THE INVENTION

The invention is generally directed to a system and method for providing a game through a computing platform, such as a gaming machine, mobile phone or personal computer.

In some embodiments, the system and method are configured to display a primary game on a display device, wherein the primary game includes a single reel, the single reel including a plurality of cells and one or more symbols or game event descriptions positioned within the cells. The cell in which the reel stops is randomly determined by a random number generator. Depending on the cell, some event, such as an event relative to the game theme may occur. If a game event occurs, a winning result, losing result, or interactive feature may ensue. If an interactive feature occurs, a player's choice may then be followed by a winning result, losing result, or another interactive feature. The method and system of the invention allows the player to make a wager on the primary game and earn points or credits during play of a gaming session.

Some embodiments of the invention are directed to an electronic gaming machine comprising: a) a display device configured to (i) display a portion of a single reel having a plurality of cells in a slot-type game, wherein each cell of the plurality of cells is associated with a scenario, the scenario including an award of game credit, a loss of game credit or interactive feature, and (ii) identify a cell of the portion displayed as being a starting position cell of the single reel; b) a user interface configured to receive (i) game credit data including an amount of game credit available for play of the game, and (ii) an instruction to play the game; and c) a data processing device configured to (i) facilitate the random-selection of an integer from a preset group of integers stored in memory, (ii) identify an ending position cell of the single reel, wherein the ending position cell is located an amount of cells equal to the randomly-selected integer relative to the starting position cell, and (iii) apply the scenario associated with the ending position cell to either add game credit, reduce game credit or actuate an interactive feature.

In some embodiments of the gaming machine, the portion displayed includes a plurality of cells.

In some embodiments of the gaming machine, the data processing device is further configured to facilitate the random-selection of scenarios for use in the cells.

In some embodiments of the gaming machine, the group of integers is less than or equal to the number of cells in the portion displayed.

The gaming machine may further comprisie a data storage device for storing player game data to permit players to continue game play from a prior session.

In some embodiments of the gaming machine, the display device and data processing device are mounted in a single housing.

In some embodiments of the gaming machine, the user interface is displayed on the display device. In some embodiments of the gaming machine, the display is a touchscreen display.

Some embodiments of the invention are directed to a gaming method comprising the steps of: displaying on a display device a portion of a single reel having a plurality of cells in a slot-type game, wherein each cell of the plurality of cells is associated with a scenario, the scenario including an award of game credit, a loss of game credit or interactive feature; identifying on the display device a cell of the portion displayed as being a starting position cell of the single reel; receiving game credit data including an amount of game credit available for play of the game; receiving through a user interface an instruction to play the game; responsive to receiving the instruction to play the game, a data processing device facilitating the random-selection of an integer from a preset group of integers stored in memory; identifying an ending position cell of the single reel, wherein the ending position cell is located an amount of cells equal to the randomly-selected integer relative to the starting position cell; and applying the scenario associated with the ending position cell to add game credit, reduce game credit or actuate an interactive feature.

In some embodiments of the gaming method each scenario includes indicia displayed in the cell.

In some embodiments, the gaming method further includes the step of the data processing device facilitating the random selection of scenarios for each cell from one or more groups of scenarios.

In some embodiments of the gaming method the step of receiving through a user interface an instruction to play the game comprises receiving an indication from the display device of a touch event.

In some embodiments of the gaming method the group of integers is less than or equal to the number of cells in the portion displayed.

In some embodiments of the gaming method the interactive feature is secondary game.

Some embodiments of the invention are directed to a single-reel gaming method for use on a computerized gaming platform comprising the steps of: displaying a portion of the reel including a plurality of cells and an identification of a cell from the plurality of cells as being a starting position cell; receiving game credit data including an amount of game credit available for play of the game; responsive to receiving an instruction to spin the reel, a data processing device facilitating the random-selection of an integer from a preset range of integers stored in memory and identifying an ending position cell, wherein the ending position cell is located an amount of cells equal to the randomly-selected integer relative to the starting position cell; animating the reel to simulate spinning and stopping at the ending position cell; and applying the scenario associated with the ending position cell to add game credit, reduce game credit or actuate an interactive feature.

BRIEF DESCRIPTION OF THE DRAWINGS

Other advantages of the invention will be readily appreciated as the same becomes better understood by reference to the following detailed description when considered in connection with the accompanying drawings wherein.

DETAILED DESCRIPTION OF VARIOUS EMBODIMENTS OF THE INVENTION

Figure 1:
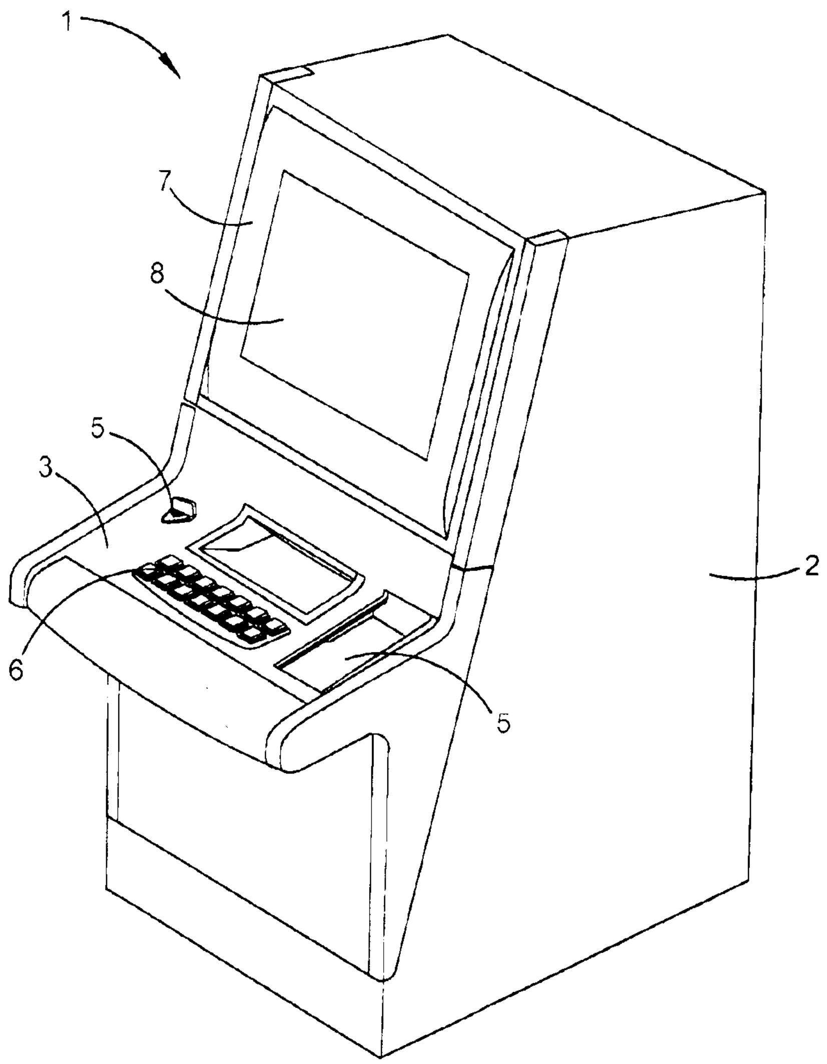
FIG. 1 is a perspective view of an exemplary electronic gaming machine which may be configured in accordance with the bonus feature embodiments of the invention.
Figure 2:
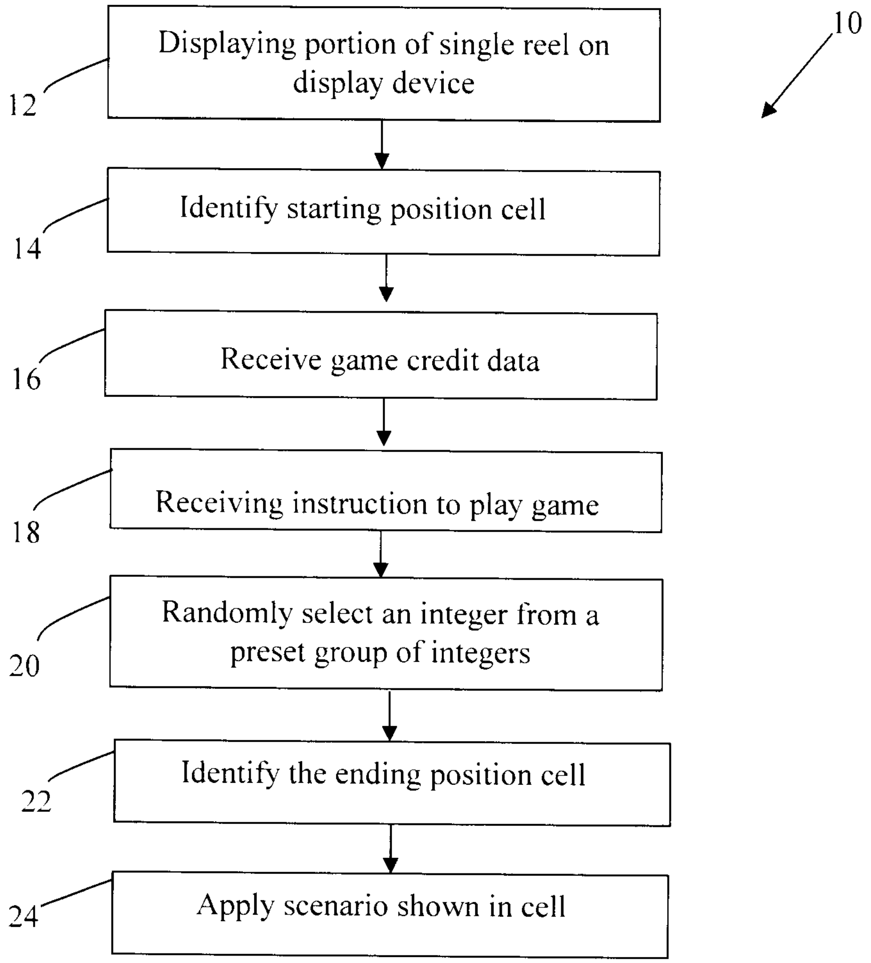
FIG. 2 is an flow diagram illustrating an exemplary method of the invention.

For the purposes of promoting an understanding of the principles in accordance with the embodiments of the present invention, reference will now be made to the exemplary non-limiting embodiments illustrated in the drawings and specific language will be used to describe the same. It will nevertheless be understood that no limitation of the scope of the embodiments of the present invention is thereby intended. Any alterations and further modifications of the inventive feature illustrated herein, and any additional applications of the principles of the embodiments of the present invention as illustrated herein, which would normally occur to one skilled in the relevant art and having possession of this disclosure, are to be considered within the scope of the present invention as claimed. The following detailed description provides systems and methods which may be employed on computer based electronic gaming machines having display devices, such as exemplary electronic gaming machine 1 shown in FIG. 1, which is described below and discussed in connection with the bonus features of the invention for illustrative purposes.

Electronic gaming machine 1 includes a cabinet 2, a console 3 and an internal electronic game controller 4. The console 3 may have various input devices including vending slots 5 for receiving monetary bets or tickets and a plurality of buttons 6 for actuation by a player. The electronic game controller 4 is generally in the form of a central processing unit, such as a computer and/or a SMIB board, and is in electronic communication with a display in the form of a display device 7, as well as various input devices on the console 3. It is also appreciated that a person skilled in the art would readily understand the location and use of the electronic game controller 4 in the electronic gaming machine 1.

The display device 7 may also display other standard game information, including rules of play, the number of preset selectable pay lines available, the amount of credits per line, the amount of player credits the amount of the current bet wagered by the player, the amount of wins by the player, a message area, a general menu button and a current denomination button indicating the currently selected base bet denomination.

The electronic game controller 4 is programmed to provide a game display 8 on display device 7 of electronic gaming machine 1 for play by a player.

As discussed herein, game display 8 is determined by a gaming method of the invention, such as gaming method 10, which is constructed and configured in accordance with some embodiments of the invention. Gaming method 10 involves play of a wagering game, such as a slot-type game, having a single slot reel displayed on display device 7.

Figure 3:
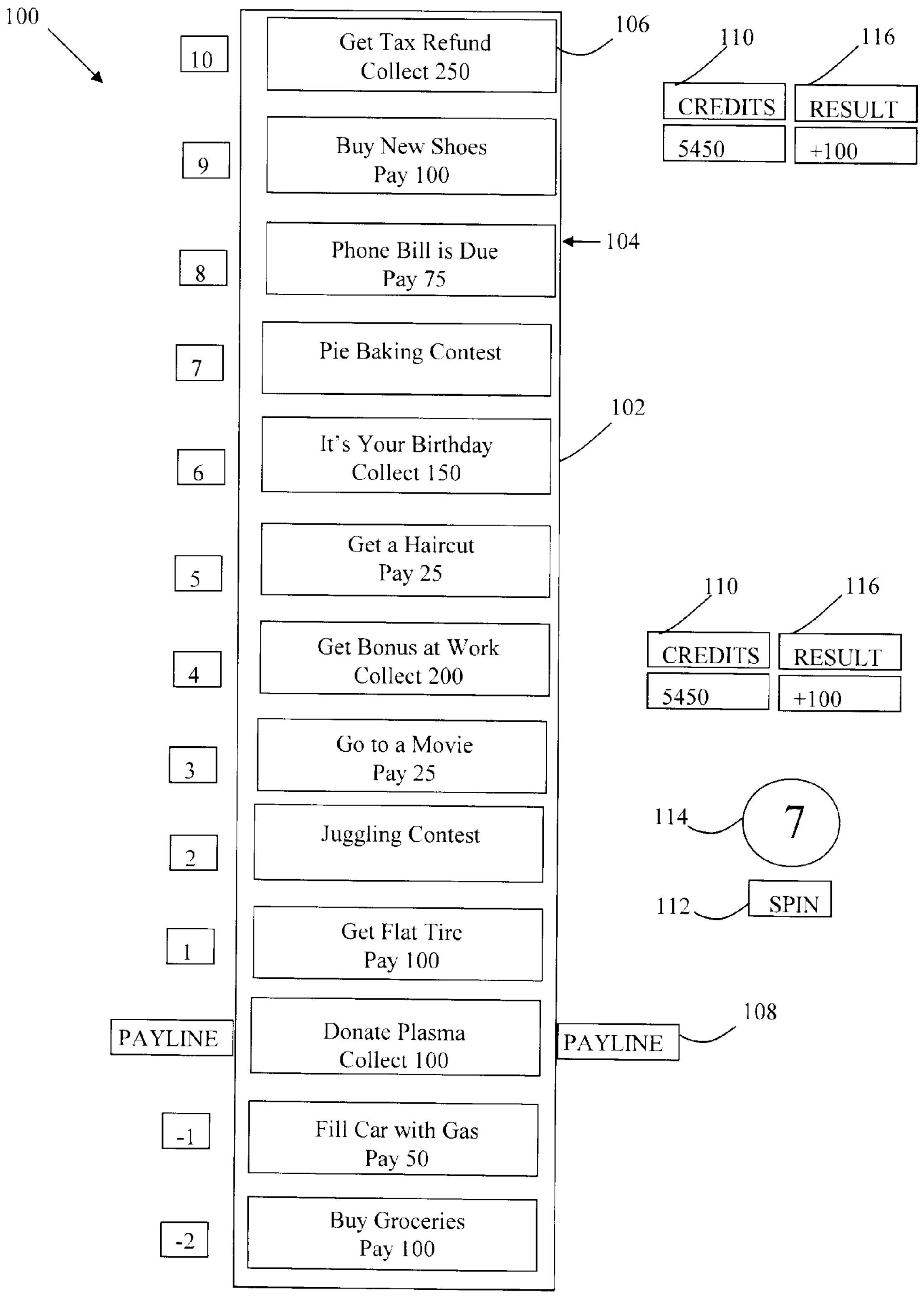
FIGS. 3-5 are exemplary game displays illustrating features of various embodiments of the invention.
Figure 4:
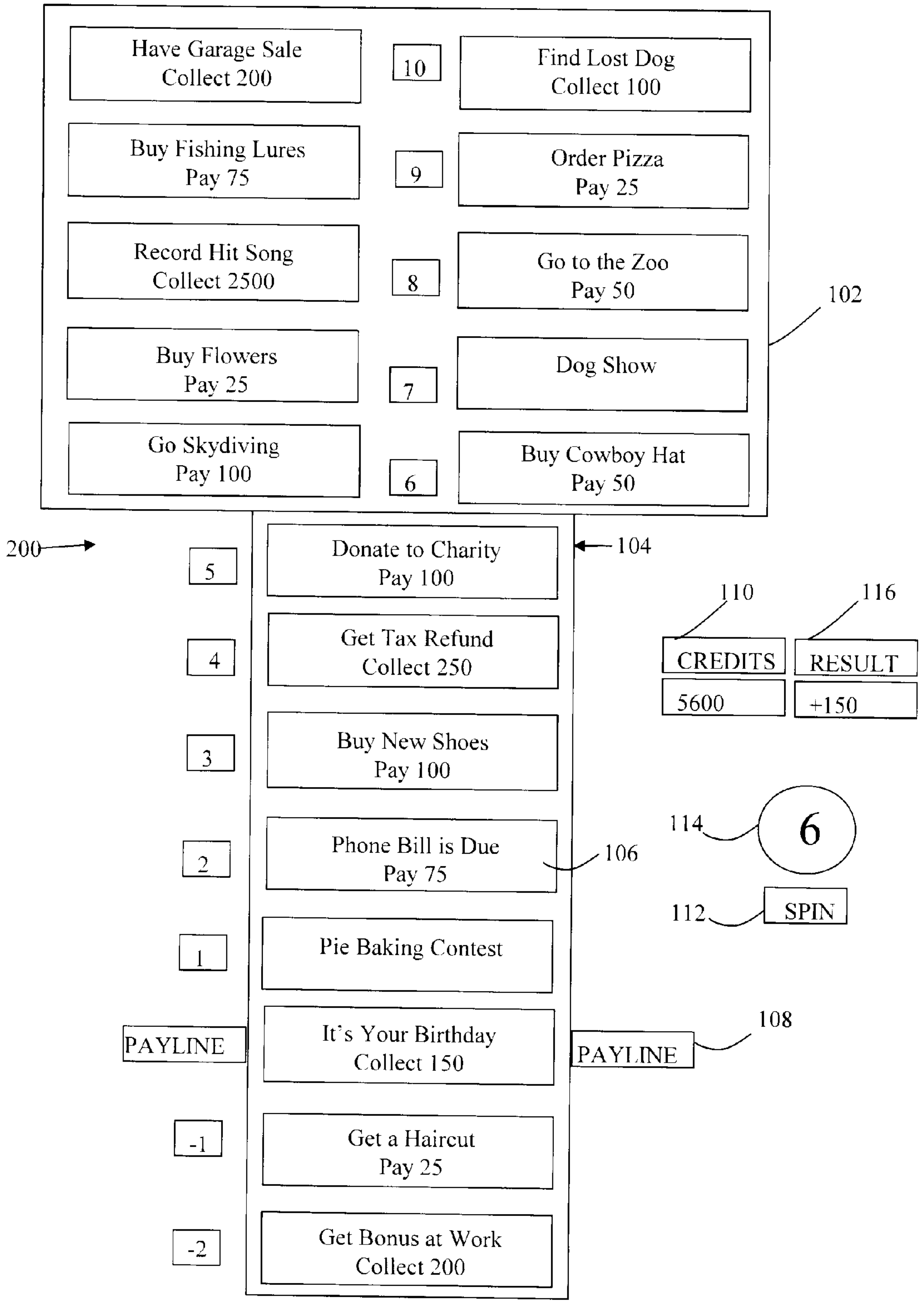
Figure 5:
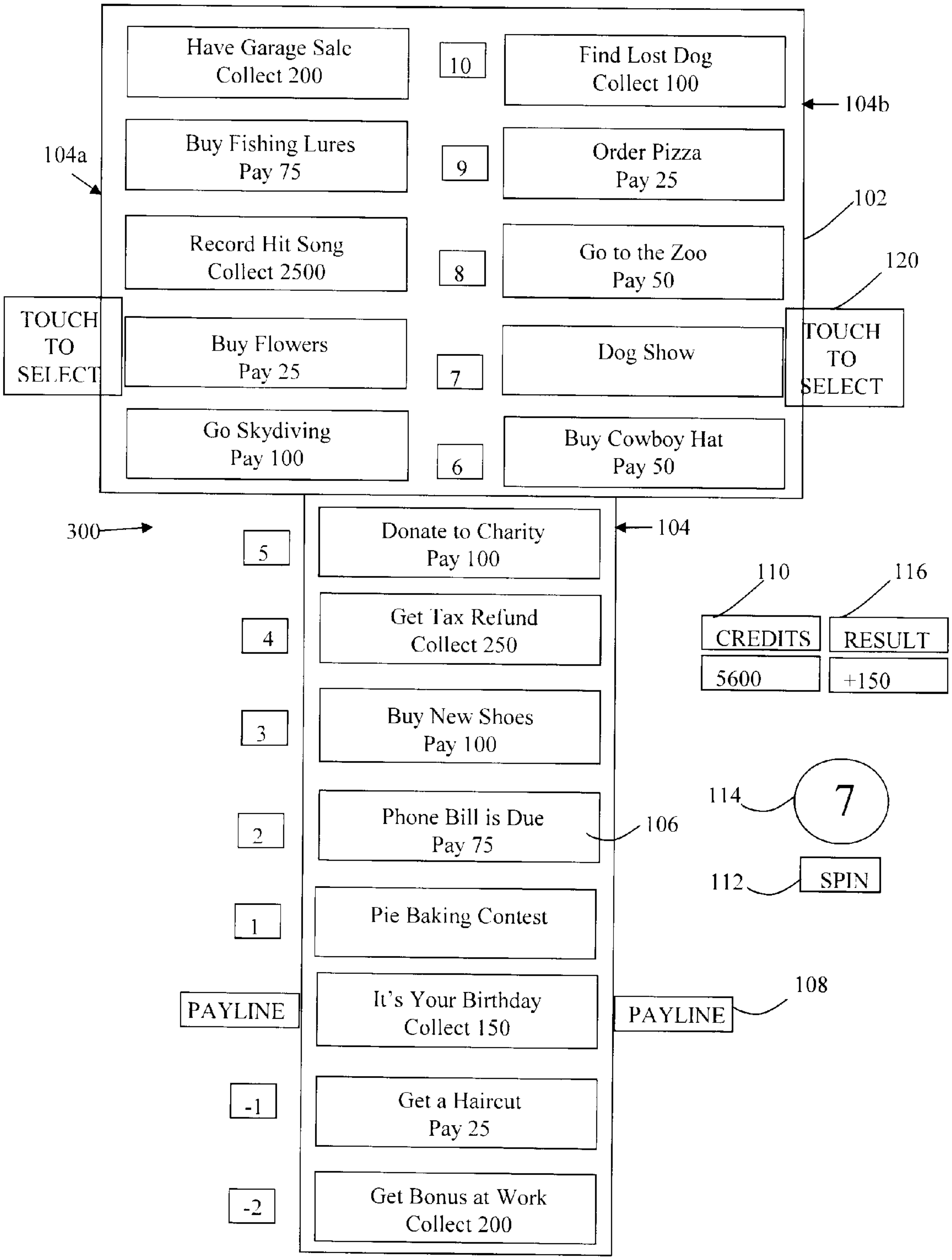

In step 12 of gaming method 10, display device 7 displays a portion of a single reel having a plurality of cells in a slot-type game such as the game display 100 in FIG. 3. In this embodiment, each of the single cells is associated with a scenario. Scenarios may include an award of game credit, loss of game credit or actuation of an interactive game feature. For example, game display 100 includes portion 102 of reel 104 having cells 106 with various scenarios indicated therein. It should be understood that additional information and fields may be provided and displayed on game display 100, such as a menu or help button, denomination of wager or play, "cash-out" button, etc.

As shown in step 14, a specific cell of the portion displayed on the display device is identified as being the starting position cell on or of the single reel. The starting position cell may be identified by any method, such as coloring, highlighting or other method. Payline indicators 108 are used in FIG. 3 to identify the starting position cell. Game controller 4 may randomly-select a starting position cell or the starting position cell may be the cell identified as the ending position cell (discussed herein below) from prior game play, either by the player or another.

As shown by step 16, game credit data including an amount of game credit available for play of the game is received for use in gaming method 10. Credit data may be shown on display device 7 as shown by 110 in FIG. 3. In some embodiments, receiving game credit data may be triggered by a player inserting money or a representative thereof, such as a ticket or card, using vending slots 5 of electronic gaming machine 1.

In step 18, instruction to play the game is receiving through a user interface. Responsive to the instruction to play the game, game controller 4 or another processing device facilitates the random-selection of an integer from a preset group of integers stored in a data storage device or memory in communication therewith, as shown by step 20. In display 100, the instruction to play the game is received by touching the "SPIN" button 112 and randomly-selected integer is displayed in field 114.

For illustrative purposes, in the embodiment shown by display 100 the integer is randomly selected from the range of integers from one to ten, that is, one, two, three, four, five, six, seven, eight, nine and ten. It should be understood that the group of integers may differ, such as for example, by including more and less integers, consecutive and non-consecutive integers, zero and both positive and negative numbers.

In step 22, an ending position cell is identified. The ending position cell is the cell that is separated from the starting position cell by the amount of cells equal to the randomly-selected integer. For example, if the randomly-selected integer is three, then the ending position cell is the cell that is three cells away from the starting position cell in a first direction. If the randomly-selected integer is negative three, for example, then the ending position cell is the cell that is three cells away from the starting position cell in the opposite direction from the first direction. Once determined, in some embodiments, the single reel is made to appear as if it spins to the ending position cell.

As shown by display 200, if the integer is six as shown in field 114, then reel 104 may appear to spin toward payline 108 such that the sixth cell from starting position cell ("Donate Plasma") is moved to be adjacent to payline 108. Thus, the ending position cell is "It's your Birthday" and the displayed portion 102 of reel 104 changes accordingly.

As shown in step 24, the scenario associated with the ending position cell is applied in the game, thus any award or loss of credit is applied to the game credit data. The scenario may be displayed as shown by the results field 116 in display 100. For example, as shown by display 200, the payout of credits associated with the cell is shown in the results field 116 and applied to the credit data shown in field 110.

As shown by display 200 and 300, the single reel 104 may be split into multiple reels with player-selectable cells 106. For example as shown in display 300, Spin button 112 has been pressed and the number seven has been randomly-selected as shown in field 114. This means the player has the option to select the seventh cell from the starting position cell of reel 104*a* and the scenario associated therewith ("Buy Flowers") or select seventh cell of reel 104*b* and the scenario associated therewith ("Dog Show"). In this embodiment, indicators 120 to assist the players in selecting one of the cells are displayed.

Thus, with each press of spin button 112, players are advanced cells and scenarios are applied. Some embodiments of the invention may include the display of animations corresponding to the scenarios in each cell. The cells may include scenarios which provide interactive features which allow for players to participate in activities or mini-games, which may be skill-based, luck-based or involve both, and can result in both the awarding of credit or the loss of credit that would impact the game credit data. These interactive features are represented in the cells as having no credit award or loss indicated such as the "Pie Baking Contest" scenario shown in FIG. 1. Upon selection, these interactive features may result in animations or special displays to facilitate the completion of the feature.

In some embodiments, scenarios used in cells of reel 104 outside of the displayed portion 102 are randomly generated by controller 4. Thus, reel 104 may be never-ending and continually changing. Scenarios may be drawn from one or more updatable groups of scenarios. When generating scenarios for each cell on the reel there is a probability that the spot will be selected from any of the possible groups. The probabilities associated with each different group may vary between cells on the reel. The probabilities are influenced by the scenarios that have already been determined for cells on the reel or game path preceding a scenario that is being generated. Once the group from which a scenario for a particular cell has been determined then another internal random number generator will be used to determine the scenario from the group that will be displayed at the cell. There is a baseline probability that when generating a scenario for a cell on the reel that multiple scenarios will be generated instead of only one. The reel will then split into multiple reels and will continue adding scenarios to each multiple reel in the same manner.

Additional scenarios may include insurance cells, lesson cells that, if selected as the ending position cell, offer the option to purchase types of insurance or take lessons, which may have a subsequent beneficial impact relative to other scenarios received during continued play. Scenarios may include payouts and bonus spots. It should be readily apparent that the scenarios may include a great variety of awards, losses or features.

A controller, computing device, or computer, such as described herein, includes at least one or more processors or processing units and a system memory, and may further comprise a random number generator. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, the system may include a database, which as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system, gaming device, gaming machine or incorporated in an existing gaming system or machine. The gaming machine of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

Those skilled in the art will readily appreciate that the apparatus described herein may include various computer and network related software and hardware, such as programs, operating systems, memory storage devices, data input/output devices, data processors, servers with links to data communication systems, wireless or otherwise, and data transceiving terminals. Those skilled in the art will further appreciate that the precise types of software and hardware used are not vital to the full implementation of the apparatus of the invention so long as it performs as described in at least one of the embodiments herein.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

What is claimed is:

1. An electronic gaming machine comprising:

a) a display device configured to (i) display a portion of a single reel having a plurality of cells in a slot-type game, wherein each cell of the plurality of cells is associated with a scenario, the scenario including an award of game credit, a loss of game credit or interactive feature, and (ii) identify a cell of the portion displayed as being a starting position cell of the single reel;

b) a user interface configured to receive (i) game credit data including an amount of game credit available for play of the game, and (ii) an instruction to play the game; and c) a data processing device configured to (i) facilitate the random-selection of an integer from a preset group of integers stored in memory, (ii) identify an ending position cell of the single reel, wherein the ending position cell is the cell located an amount of cells along the single reel that is equal to the randomly-selected integer relative to the starting position cell, and (iii) apply the scenario associated with the identified ending position cell to either add game credit, reduce game credit or actuate an interactive feature.

2. An electronic gaming machine as recited in claim 1, wherein the portion displayed includes a plurality of cells.

3. An electronic gaming machine as recited in claim 1, wherein the data processing device is further configured to facilitate the random-selection of scenarios for use in the cells.

4. An electronic gaming machine as recited in claim 1, wherein the group of integers is less than or equal to the number of cells in the portion displayed.

5. An electronic gaming machine as recited in claim 1, further comprising a data storage device for storing player game data to permit players to continue game play from a prior session.

6. An electronic gaming machine as recited in claim 1, wherein the display device and data processing device are mounted in a single housing.

7. An electronic gaming machine as recited in claim 1, wherein the user interface is displayed on the display device.

8. An electronic gaming machine as recited in claim 7, wherein the display is a touchscreen display.

9. A gaming method comprising the steps of:

a) displaying on a display device a portion of a single reel having a plurality of cells in a slot-type game, wherein each cell of the plurality of cells is associated with a scenario, the scenario including an award of game credit, a loss of game credit or interactive feature;

b) identifying on the display device a cell of the portion displayed as being a starting position cell of the single reel;

c) receiving game credit data including an amount of game credit available for play of the game;

d) receiving through a user interface an instruction to play the game;

e) responsive to receiving the instruction to play the game, a data processing device facilitating the random-selection of an integer from a preset group of integers stored in memory;

f) identifying an ending position cell of the single reel, wherein the ending position cell is the cell located an amount of cells along the single reel that is equal to the randomly-selected integer relative to the starting position cell; and g) applying the scenario associated with the identified ending position cell to add game credit, reduce game credit or actuate an interactive feature.

10. A gaming method as recited in claim 9, wherein each scenario includes indicia displayed in the cell.

11. A gaming method as recited in claim 9, further comprising the step of the data processing device facilitating the random selection of scenarios for each cell from one or more groups of scenarios.

12. A gaming method as recited in claim 9, wherein the step of receiving through a user interface an instruction to play the game comprises receiving an indication from the display device of a touch event.

13. A gaming method as recited in claim 9, wherein the group of integers is less than or equal to the number of cells in the portion displayed.

14. A gaming method as recited in claim 9, wherein the interactive feature is secondary game.

15. A single-reel gaming method for use on a computerized gaming platform comprising the steps of:

a) displaying a portion of the reel including a plurality of cells and an identification of a cell from the plurality of cells as being a starting position cell;

b) receiving game credit data including an amount of game credit available for play of the game;

c) responsive to receiving an instruction to spin the reel, a data processing device facilitating the random-selection of an integer from a preset range of integers stored in memory and identifying an ending position cell, wherein the ending position cell is the cell located an amount of cells along the single reel that is equal to the randomly-selected integer relative to the starting position cell;

d) animating the reel to simulate spinning and stopping at the ending position cell; and e) applying the scenario associated with the ending position cell to add game credit, reduce game credit or actuate an interactive feature.

16. A gaming method as recited in claim 15, wherein each scenario includes indicia displayed in the cell.

17. A gaming method as recited in claim 15, further comprising the step of the data processing device facilitating the random selection of scenarios for each cell from one or more groups of scenarios.

18. A gaming method as recited in claim 15, wherein the step of receiving through a user interface an instruction to play the game comprises receiving an indication from the display device of a touch event.

19. A gaming method as recited in claim 15, wherein the group of integers is less than or equal to the number of cells in the portion displayed.

20. A gaming method as recited in claim 15, wherein the interactive feature is secondary game.

* * * * *